July 23, 1940.                R. M. MORLEY                 2,208,772
                         WINDSHIELD WIPER MOTOR
                          Filed March 11, 1938
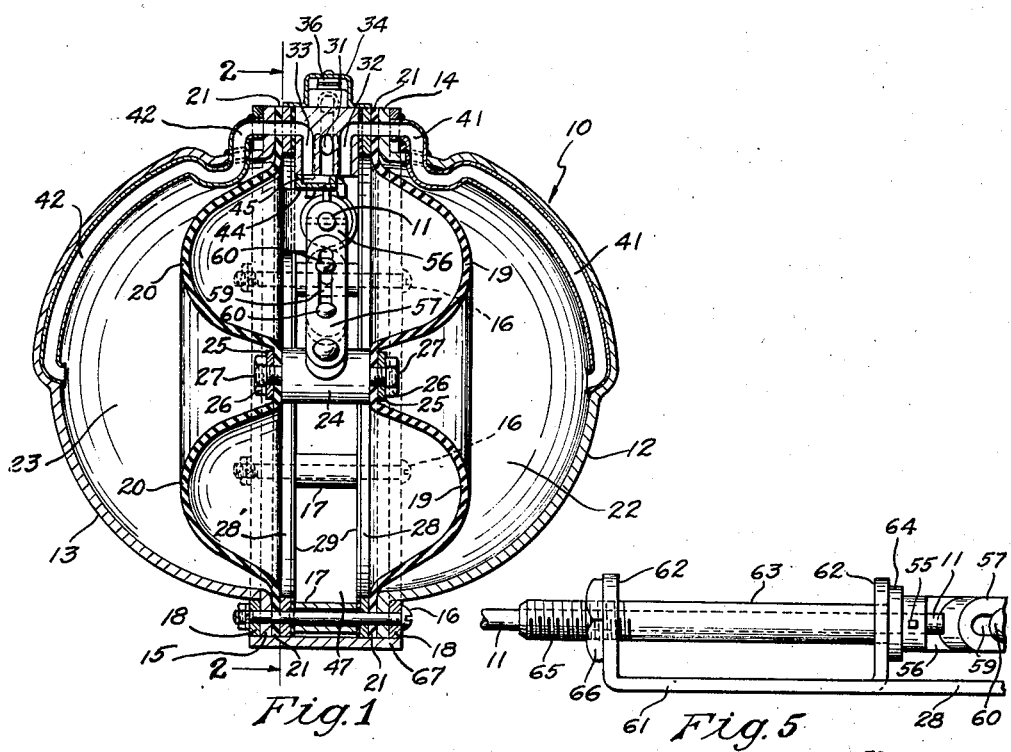
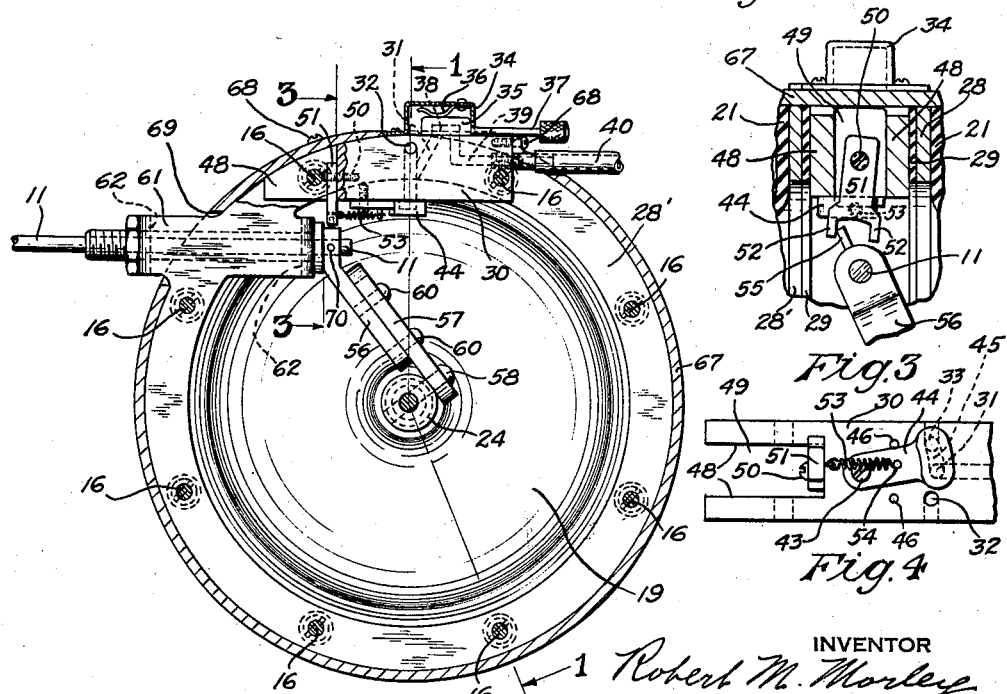
INVENTOR
Robert M. Morley
BY
Wooster & Davis
ATTORNEYS Patented July 23, 1940

2,208,772

UNITED STATES PATENT OFFICE 2,208,772

WINDSHIELD WIPER MOTOR

Robert M. Morley, Derby, Conn.

Application March 11, 1938, Serial No. 195,257

2 Claims. (Cl. 121—48)

This invention relates to new and useful improvements in windshield wiper motors and has particular relation to the suction operated type of windshield wipers.

An object of the invention is to provide a windshield wiper motor of simple and compact construction and wherein the parts are so arranged that they may be of sturdy construction whereby the motor while inexpensive to manufacture will require but a relatively small space for its mounting or installation and will have long useful life.

Other objects and advantages will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the scope of the invention.

In the drawing:

Fig. 1 is a sectional view through my improved windshield wiper motor, the view being taken as along the line 1—1 of Fig. 2;

Fig. 2 is a sectional view taken as along the line 2—2 of Fig. 1;

Fig. 3 is a detail sectional view taken as along the line 3—3 of Fig. 2;

Fig. 4 is a bottom plan view showing the automatic reversing valve employed; and Fig. 5 is an enlarged plan view showing the mounting of the oscillating shaft for carrying the wiper blade.

Referring in detail to the drawing my improved windshield wiper includes an actuating means or motor generally designated 10, and adapted to apply an oscillating movement to a shaft 11 arranged to carry any or the usual wiping blade or squeegee (not shown). Motor 10 comprises an outer somewhat globular casing including a pair of similar parts 12 and 13 preferably pressed out from sheet metal so as to be substantially semi-spherical or cup shaped and having their open sides toward one another.

At their open sides parts 12 and 13 are provided with outwardly directed flanges 14 and 15 respectively, and such flanges are connected by bolts 16 and are held in spaced relation by means of spacers or sleeves 17 on the bolts between the flanges. Rings 18 may be provided at the outer sides of the flanges 14 and 15, and it is on such rings that the bolt head and nut directly bear when tightened to make secure the assembly.

Arranged to close the open sides of the parts 12 and 13 are flexible diaphragms 19 and 20 respectively. Such diaphragms are cone shaped and have their edge portions 21 secured against the flanges 14 and 15 of the parts with which the diaphragms are associated. Each diaphragm projects into the part to which its edge portion is secured with the result that chambers 22 and 23 are formed in the parts 12 and 13 between the outer walls of such parts and the diaphragms. Each diaphragm has its apex drawn back into its body portion or toward the apex of the other diaphragm.

The apices of the diaphragms are connected by a rigid means or block 24 against the ends of which such apices are clamped, as by washers 25 held in place by nuts 26 threaded onto bolt-like extensions 27 carried by the said connecting means. Rings 28 and 28' may be disposed against the edge portions 21 of the diaphragms to distribute the clamping pressure thereon and sealing rings 29 are located against such rings 28 and 28'.

Located between the diaphragms is a valve mechanism comprising a body or block 30 secured in place by a pair of the bolts 16. This block has a suction passage 31 and a pair of applicator or distributing passages 32 and 33 opening through its lower side. On the upper side of the body 30 is a small housing 34 containing a valve 35 held against the body as by a spring 36 and including a hand piece 37 projecting for manual actuation of the valve. Valve 35 has a recess or passage 38 in its under or inner side whereby when the valve is in the position of Fig. 2 such passage places the suction passage 31 before mentioned in communication with a passage 39 adapted to be connected with the suction side of an internal combustion engine through a pipe or tube 40.

Distributing passage 32 is connected with the chamber 22 through the medium of a tube 41 while passage 33 is in the same manner connected with chamber 23 through tube 42. Pivoted at 43 to the under or inner side of body 30 is a valve 44 having a recess or passage 45 in its upper side or the side against the block 30. This valve is movable about pivot 43 but is limited in its movement by means of stops 46 arranged one at each side of the valve. When valve 44 is positioned as in Fig. 4 its passage 45 is placing suction passage 31 in communication with the distributing passage 33 where air will be exhausted from chamber 23 through tube 42. The passage 32 is in communication with the space 47 between the diaphragms, which space is in communication with the atmosphere. When the valve is moved in the opposite direction to a position against the other stop it then places the suction passage 31 in communication with the chamber 22 by way of the passage 32 and the tube 41 and passage 33 is placed in communication with the space 47.

Thus while the valve 44 is in a position placing suction passage 31 in communication with one distributing passage the other distributing passage is open to the atmosphere in the space 47 between the opposed ends of the diaphragms. From the above it will be clear that as the valve 44 is moved first in one direction and then in the other about its pivot 43 the air is exhausted first from one chamber 22 or 23 and then from the other whereby the diaphragms move first in one direction and then in the other by atmospheric pressure in the intermediate space 47. Obviously movement of the diaphragms results in movement of the connecting means or block 24 secured to their apices.

Toward one end body 30 is bifurcated providing a pair of arms 48 and a space 49 between such arms. Pivoted at 50 against the end of the body between arms 48 is an actuating member or lever 51 the lower end of which is bifurcated providing fingers 52 for a purpose to be described. Lever 51 has attached thereto one end of a coil spring 53 the other end of which is secured to the valve 44 at 54.

From an inspection of Fig. 4 it will be understood that as lever 51 is moved about its pivot 50 first in one direction and then in the other it will carry the spring 53 back and forth across the valve pivot 43 with the result that said valve 44 will be snapped by the spring back and forth between the stops 46 as the lever 51 reaches its extremes of movement. In this way the valve 44 is snapped back and forth from one extreme position to the other to have the air exhausted first from one and then from the other of the chambers 22 and 23 as the lever 51 is oscillated.

Located between the fingers 52 of lever 51 is a lug or projection 55 carried by the upper end of a link-like member 56 to which is connected a second link-like member 57 pivoted to the connecting means or block 24 by a pivot 58. Beyond the overlapping portion of member 57 the member 56 is disposed about the inner end of the shaft 11 and is rigidly secured thereto as by a pin 70.

As the diaphragms move first in one direction and then in the other causing movement of the connecting means 24, the movement of the latter through the member 57 will be transmitted to member 56 and thus to lug 55. As the latter is rocked back and forth it engages first one of the fingers 52 and then the other thereof, with the result that the lever 51 is rocked back and forth, and moving the spring 43, as above set forth, causes the valve 44 to be snapped back and forth at the extremes of the movement of lever 51, whereby the suction is applied first to one and then the other of the chambers 22 and 23.

To keep the diaphragms in a direct line of motion and thus avoid their buckling the members 56 and 57 are connected with a pin and slot arrangement whereby one may slide on the other. Thus member 57 is provided with a slot 59 through which extend spaced pins 60 carried by the member 56. This construction permits of relative longitudinal movement of the members to compensate for back and forth movement of the lower or inner end of member 57. However, the double pin arrangement prevents any relative pivotal movement of the members whereby as the lower end of member 57 is carried back and forth by the diaphragms the upper end of member 56 is rocked back and forth imparting an oscillating movement to the shaft 11.

Shaft 11 is mounted on a bracket 61 carried by one of the strengthening rings, in the present case the ring 28. Bracket 61 includes arms 62 carrying a sleeve 63 forming a bearing for the shaft 11. At one end the sleeve includes a flange or head 64 and its other end is threaded at 65 to receive a nut 66 for drawing the head against an arm 62 whereby the sleeve is mounted securely. Obviously a wiper or squeegee secured to the outer end of shaft 11 will have oscillating movement applied thereto as the arm is actuated by the diaphragms. The ring 28 may be stamped from sheet metal and the arms 62 bent laterally to proper position.

A band-like closure 67 is disposed about the edges of the flanges 14 and 15 of parts 12 and 13 and the edge portions 21 of the diaphragms whereby to substantially close the space between the latter. The band 67 is of split construction and its ends may be secured to the valve body 30 as by screws 68. This band serves to strengthen the assembly and to exclude dirt and dust but is provided with an opening 69 through which extends the bracket 61 and the bearing sleeve 63 as well as the shaft 11. Such opening also admits air to the space 47.

From the above description it will be understood that the device of the invention comprises but a relatively few parts and that a relatively compact structure is provided. The parts are all within the casing formed by the sheet metal casing members 12 and 13. The diaphragms in addition to actuating the wiper shaft 11 serve to cause actuation of the valve 44 whereby the action of the diaphragms is reversed at the end of each complete movement. Valve 35 is for starting and stopping the device and it will be apparent that when the valve is pushed in from the position of Fig. 2 there will be no communication between passage 31 and passage 39 and thus no suction will be available in suction passage 31 for distribution to the chambers 22 and 23 and the device will be out of action.

Having thus set forth the nature of my invention, what I claim is:

1. In a windshield wiper motor, a pair of hollow metal parts each having a closed and an open side with an outwardly extending flange about the open side, means connecting said flanges and maintaining them in fixed spaced relation with the open sides of the said parts in opposed relation, a diaphragm in each of said parts, a separate ring clamping each diaphragm to the respective flange of its hollow part to form a chamber in said part, said flange connecting means also forming means for clamping the rings and diaphragms against the flanges, means connecting the centers of the diaphragms, a valve body located between the rings and having a suction passage and distributing passages leading to the respective chambers, valve means mounted on said body and shiftable to place said distributing passages alternately in communication with said suction passage, means for actuating said valve means from said second named connecting means, a shaft, and means connecting said second named connecting means with the shaft for operating it.

2. In a windshield wiper motor, a pair of hollow metal parts each having a closed and an open side with an outwardly extending flange about the open side, a diaphragm in each of said parts and seated against its flange to form a chamber in said part, a clamping ring on the opposite side of each diaphragm to clamp it against the flange, a bearing on one of said rings, a shaft in the bearing, spacing elements between the rings to hold the parts in spaced relation, transverse bolts clamping the flanges and rings against the spacing elements, means connecting the centers of the diaphragms, operative means connecting the connecting means with the shaft, a valve block mounted in the space between the parts, valve means on the block for alternately connecting the suction passage with the respective distributing passages, means for operating the valve from said second named connecting means, and a covering strap around the edges of the flanges and extending between them to enclose the space between said parts.

ROBERT M. MORLEY.